DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MARCH 4, 1975

932 O.G. 9

T932,001

ETHYLENE/ETHYLENICALLY UNSATURATED CARBOXYLIC ACID/UNSATURATED ESTER LOW MOLECULAR WEIGHT INTERPOLYMERS USEFUL AS ADHESIVES

George E. Waples, Jr., 503 Sycamore; Michael B. Smithers, 500 Williow Drive; and Ben W. Heinemeyer, 118 Pecan Lane, all of Lake Jackson, Tex. 77566

Continuation-in-part of abandoned application Ser. No. 169,869, Aug. 6, 1971. This application July 30, 1973, Ser. No. 384,155

Claims priority, application Canada, July 5, 1972, 146,369

Int. Cl. C08f *15/40*

U.S. Cl. 260—80.8

No Drawing. 22 Pages Specification

Low molecular weight interpolymers of ethylene, ethylenically unsaturated carboxylic acid such as acrylic acid and ethylenically unsaturated ester such as ethyl acrylate or vinyl acetate which interpolymers have viscosities from about 500 to about 10,000 centipoises at 350° F. are useful as adhesives, particularly as adhesives in the lamination of non-adhering plastic materials to glass.